Figure 1:
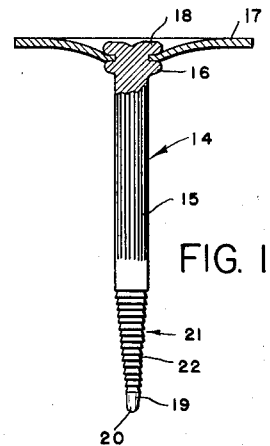

Jan. 10, 1961

R. L. HALLOCK 2,967,448

DRIVE FASTENER WITH ANCHORING TEETH ON THE TAPERED PORTION THEREOF

Filed June 20, 1955

3 Sheets-Sheet 1

INVENTOR
R. L. HALLOCK
BY A. Yates Dowell
ATTORNEY

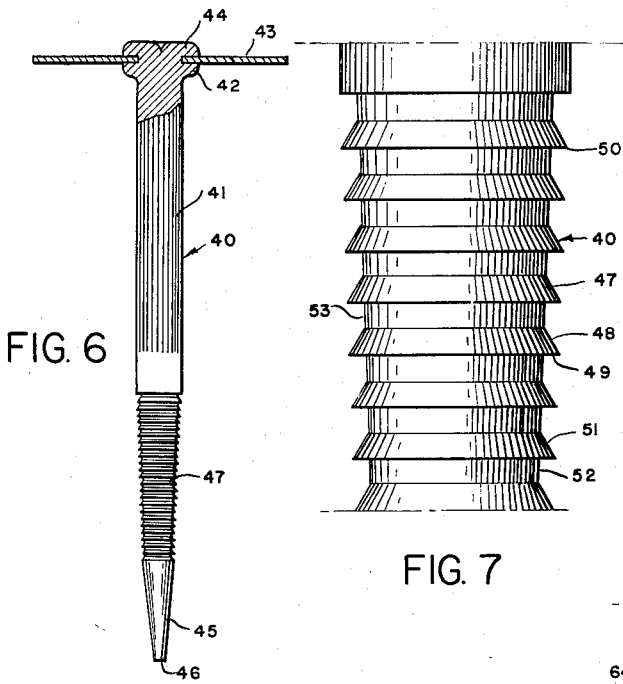
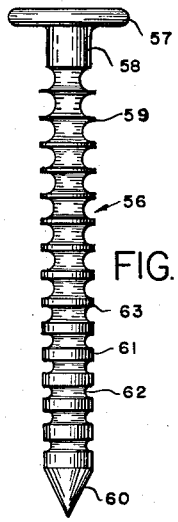
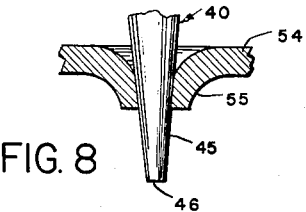
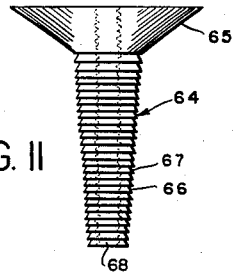
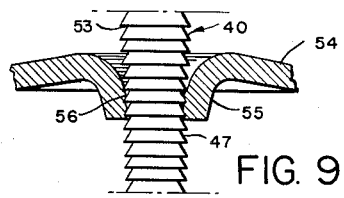
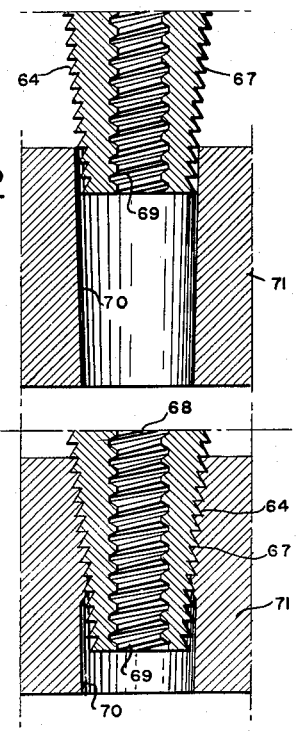

Jan. 10, 1961   R. L. HALLOCK   2,967,448
DRIVE FASTENER WITH ANCHORING TEETH
ON THE TAPERED PORTION THEREOF
Filed June 20, 1955   3 Sheets-Sheet 3
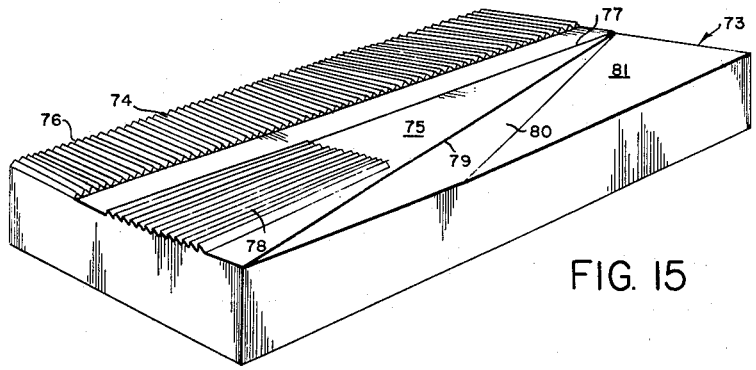
FIG. 15
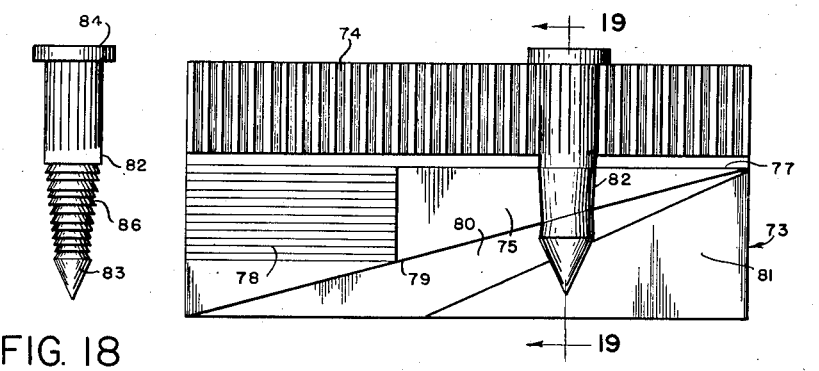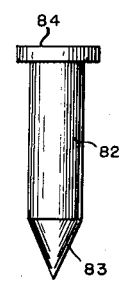
FIG. 18   FIG. 16   FIG. 17
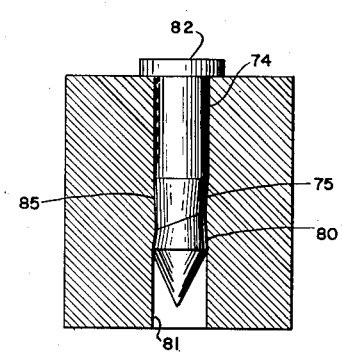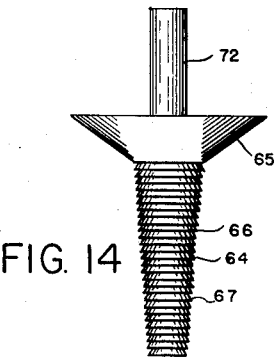
FIG. 19   FIG. 14
INVENTOR
R. L. HALLOCK
BY A. Yates Dowell.
ATTORNEY

United States Patent Office 2,967,448
Patented Jan. 10, 1961

2,967,448

DRIVE FASTENER WITH ANCHORING TEETH ON THE TAPERED PORTION THEREOF

Robert Lay Hallock, 32 Vine Road, Larchmont, N.Y.

Filed June 20, 1955, Ser. No. 516,684

8 Claims. (Cl. 85—21)

This invention relates to construction materials of metal, wood, plastic, composition, or the like, including that in sheet form, to fastening means for maintaining the same in assembled relation, and to the method and apparatus by which such fastening means is produced.

The invention relates more particularly to nails, rivets, and other self-anchoring fasteners designed for fastening bodies of various kinds including sheet material in assembled relation so that they offer higher resistance to and cannot be readily separated.

Difficulty has been experienced in fastening together certain materials including, among other things, roofing to metal roof decks, insulation to sheet metal ducts, and the like, due to failure to obtain proper anchorage of the fastener and a hermetically sealed bond between the fastener and the metal.

In order to overcome such problems fasteners have been provided having annular grooves but these have not been satisfactory because the sheet metal into which they were driven was displaced permanently so that there was nothing to hold the parts together other than friction between the fastener and the sheet metal since the displaced material did not flow back into the annular grooves after such displacement and therefore did not provide the necessary bond and hermetic seal which would prevent leakage through the hole in the sheet metal.

It is an object of the invention to overcome the above difficulties and to provide a fastener which when driven into a sheet will be firmly anchored and form a hermetically sealed bond with the sheet metal and will retain such seal even when heated and will require substantial force of the order of 120 to 800 lbs. to loosen the same depending on the thickness of the sheet metal and the dimension of the fastener.

Another object of the invention is to provide a fastener which when driven into sheet metal will progressively broach and press rings from the sheet metal into recesses in the fastener thereby forming a hermetically sealed bond between the fastener and the metal sheet so that the fastener is firmly anchored in position regardless of how far it is driven into the sheet material.

Another object of this invention is the provision of a sheet material fastener which will punch a clean hole within the sheet material and then form a smooth downwardly extending collar around the hole without tearing or ripping the sheet material from the edges of the hole.

Another object of the invention is to produce a fastener having a knurled or ribbed portion and a tapered portion with teeth thereon, the ribbed portion providing means by which the fastener can be rotated during the progressive formation of the tapered portion and the teeth.

A further object of the invention is to provide a tapered combination rivet and bushing having an axial tapped opening which device can be driven into anchoring position and the tapped portion used to receive a threaded fastener.

Another object of the invention is to provide method and apparatus for producing a tapered fastener with anchoring teeth on the tapered portion of the same.

A still further object of the invention is to produce a tapered fastener with anchoring teeth on the tapered portion by applying rolling pressure to form a gripping portion and simultaneously and progressively forming a taper and anchoring teeth therein.

Figure 2:
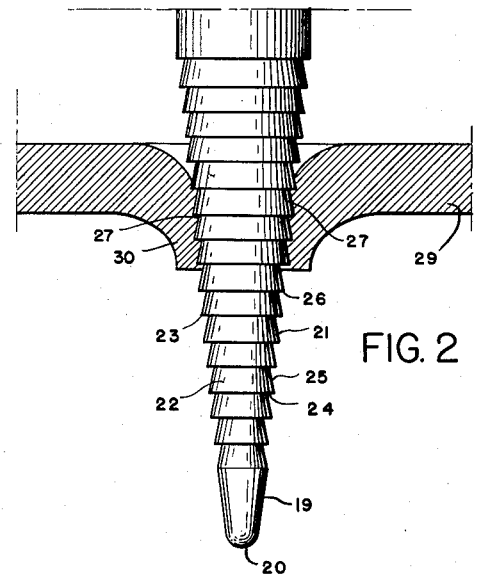
Figure 4:
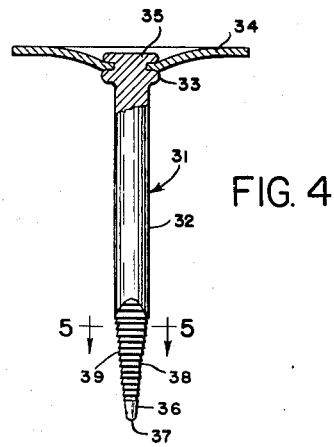
Figure 3:
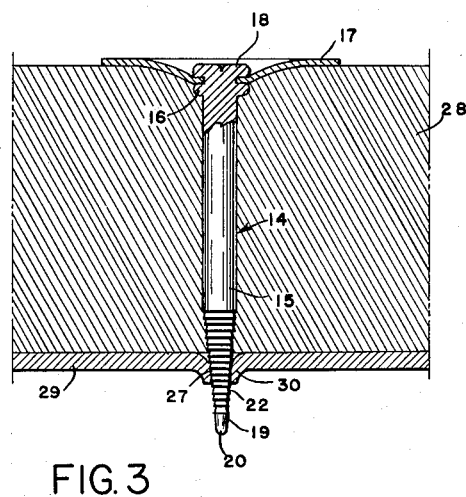
Figure 5:

Further objects and advantages of the invention will be apparent from the following description taken in conjunction with the accompanying drawings wherein:

Fig. 1 is an elevational view of a nail showing the head portion broken away;

Fig. 2, a fragmentary enlarged view of the nail shown in Fig. 1, fastened within a sheet metal section;

Fig. 3, a sectional view of the nail of Fig. 1 holding insulation to a sheet metal roofing deck;

Fig. 4, an elevational view of a modified nail;

Fig. 5, a sectional view taken on lines 5—5 of Fig. 4;

Fig. 6, an elevational view of a further modification having a portion broken away;

Fig. 7, an enlarged fragmentary view of the nail shown in Fig. 6;

Fig. 8, a fragmentary sectional view illustrating the initial penetration of sheet metal of a nail according to the invention;

Fig. 9, a sectional view of the nail in position illustrating the condition of the sheet metal after force has been applied to withdraw the nail from the sheet metal.

Fig. 10, an elevational view of a modified nail for use in wood or other similar materials;

Fig. 11, an elevational view of a combination rivet and bushing;

Fig 12, a sectional view of the combination rivet fastener of Fig. 11 in an initial position prior to its being driven into fastening position within an opening in a metal section;

Fig. 13, a sectional view of the combination rivet-bushing of Fig. 12 during the process of being driven into fastening position;

Fig. 14, an elevational view of the combination rivet-bushing of Fig. 12 between the stages of its manufacture;

Fig. 15, a perspective view of a modified nail rolling die;

Fig. 16, an elevational view of the die of Fig. 15 and a nail during the process of rolling with the front die omitted;

Fig. 17, an elevational view of the nail blank prior to rolling;

Fig. 18, an elevational view of the nail blank after rolling; and,

Fig. 19, a sectional view taken on the line 19—19 of Fig. 16.

Briefly stated, the invention comprises a self-anchoring metal fastener particularly suitable for use with sheet material, and a method and apparatus for producing the same. The fastener includes a tapered portion with broaching and anchoring teeth which when driven into sheet material progressively broach rings from the sheet material which enter the recesses of the fastener and produce a hermetically sealed bond between the fastener and the sheet material.

The method includes the rolling of the fastener between dies which form a gripping surface and progressively produce the taper and the broaching and anchoring teeth.

The apparatus or dies are of rectangular configuration with a longitudinal strip of a shape to produce a gripping portion on the fastener and a parallel longitudinal strip having first a progressively tapered portion for providing a taper on the fastener and subsequently providing broaching and anchoring teeth.

With further reference to Figs. 1 and 2, a nail 14 is shown having a round shank 15 which is knurled or ribbed and carries a collar 16 near its upper end. A head 17 is fixed on the upper end of shank 15 and is supported on collar 16 with the extension 18 of shank 15 flattened over firmly fastening the head 17 in position. The lower end of the shank 15 has a smooth tapered section 19 extending from a point 20 and extending into a tapered toothed section 21, which has a series of annular teeth 22.

Teeth 22 increase in diameter progressively from tapered section 19 to the upper termination of toothed section 21 and comprise spaced frusto conical shaped teeth having their bases 24 facing toward the tapered section 19. The edges 23 between the base or face 24 and the sides 25 of teeth 22 from cutting edges which are adapted to progressively broach or cut rings during penetration within sheet metal.

The recesses 26 formed between the sides of a tooth 22 and the face of the next tooth are adapted to hold the metal rings which are pressed or extruded from the metal. These recesses are shallow, adapting them to become clogged with the metal rings, thereby forming a hermetically sealed bond between the nail and the sheet metal. It should be emphasized that the nail is so designed that the metal rings are not severed from the surrounding sheet metal until the cutting tooth has passed through the sheet metal and emerged therefrom.

The above described embodiment of a sheet metal nail is particularly adapted to be used in sheet metal having a thickness of .045 to .075 inch. It has been found that the distance between the adjacent faces or bases 24 of the teeth 22 should preferably be ½ to ⅕ the least thickness of the sheet metal with which the nail is designed to be used with. This nail has a shank having a diameter of .120 to .180 inch with tapered teeth positioned between .015 to .030 inch apart and with each tooth having a cutting edge increased by not more than .002 inch in diameter over the next adjacent smaller tooth. The clearance angle of the sides 25 taken from the longitudinal axis is approximately 10 degrees.

The nail 14 of Fig. 1 is normally manufactured from mild 10–10 steel and case hardened afterwards for production of a finished nail that is extremely hard. This process could be varied by starting with a carbon steel. The nail 14 is formed in steps which comprise the first step of a machine biting a conical point on a nail and at the same time severing the nail from a metal wire or rod stock. Simultaneously, the collar 16 forming a lower head stop is formed on the nail.

The second step consists of rolling the nail between a pair of reciprocating or translating dies which move in opposite directions relative to each other. Only one of the dies moves to produce this relative motion. These dies have vertical ribs or knurling on the upper portions of their opposing faces which grip the shank and rotate the nail. The lower portions of the opposing faces of the dies have teeth-forming surfaces which roll the cutting teeth on the tapered section of the nail while it is being rotated between the pair of dies.

The third step consists of the positioning of the head 17 on the collar 16 and the flattening of the terminal end 18 of the shank in position thereby firmly fastening the head 17.

With continued reference to Figs. 2 and 3, nail 14 is illustrated fastening insulation 28 in position on a sheet metal roof deck 29. A substantial collar 30 has been pressed downwardly from the sheet metal 29 during movement therethrough of smooth tapered section 19. As the teeth 22 continued through the opening in collar 30, rings of metal 27 have been pressed or cut from the inner walls of the opening without completely being severed therefrom and made to flow into recesses 26.

When the nail is completely in position within collar 30, the metal 27 completely fills recesses 26 thereby forming a very tight bond between the nail and the surrounding sheet metal. This bond forms a hermetically tight seal and holds the seal even under heated conditions such as would be found during a fire within the building. This seal is produced regardless of the depth of penetration of the nail as long as the annular teeth 22 are in contact with the sheet metal. Therefore, the toothed section 21 is long enough to be effective with manufacturing tolerance variations in nail length and insulation thickness. Also, in order to remove the nails from the metal, a substantial force amounting to 120 to 800 pounds is required to separate the nail from the sheet metal, depending on the thickness of the sheet metal deck.

In a recent large factory fire where the damage amounted to millions of dollars and the factory was forced out of production for approximately six months, a small fire got out of control because hot roofing bituminum leaked through punctured holes in the metal roof and fed the fire to such a degree that it was impossible to get the fire under control before the factory was completely ruined.

From this experience it has been found that it is important to use a vapor barrier and a method or means for fastening insulation to metal roofing decks without penetrating the decks unless the hole is completely sealed and remains sealed under heated conditions. The nail of the present invention has been found to be completely satisfactory under these conditions and if the ruined factory had been built with these nails, the fire would probably have been controlled relatively easily without doing any substantial damage. Vapor permeability is zero when this nail is in position within the sheet metal deck.

With further reference to Figs. 4 and 5, a nail 31 is illustrated having a round shank 32 which has at its upper end a stop collar 33 carrying a head plate 34 fastened in place by a flattened over portion 35 of shank 32. The above-mentioned structure is identical to the nail embodiment shown in Figs. 1 and 2.

The lower end of the shank has formed thereon a square tapered section 36 having a pyramid shaped terminal end 37. Above smooth tapered section 36 is a toothed tapered section 38 which is also substantially square and carries teeth 39 which are also square. The nail 31 cuts or presses metal rings from sheet metal which it is driven into in substantially the same way as described for the nail of Figs. 1 and 2.

Nail 31 has been designed with a square section in order to be made by a process of simultaneously cutting the nail from a continuous length of wire or rod stock and forming the taper while at the same time placing the teeth thereon by a pair of cutting dies which are forced together around the square section, the cutting dies carrying the necessary configuration to form the teeth 39.

With continued reference to Figs. 6 and 7 of the drawing, a nail 40 is illustrated which may be used with light gauge sheet metal having a thickness as low as .030", as well as the thicker gauges. The nail 40 has a round knurled or ribbed shank 41 carrying a stop collar 42 at its upper end on which a head plate 43 is supported and is fastened in place by a flattened over portion 44 of shank 41. This structure is substantially identical to the previously described similar structure of the other embodiments. The shank 41 has a smooth tapered section 45 of substantial length and terminating in a flat end 46.

A toothed section 47 lies intermediate shank portion 41 and smooth tapered section 45. The toothed section 47 has teeth 48 thereon in the form of frusto conical sections having their bases or faces 49 positioned toward smooth tapered section 45. The diameter of the base of each tooth 48 progressively increases from the tapered section 45 to where the teeth merge into the shank 41.

The outer edges 50 of the teeth 48 form cutting edges during penetration of sheet metal. In the desired form the alignment of these edges forms a taper approximately 1½ degrees taken along the longitudinal axis of the nail. Inclined sides 51 extend rearwardly from the cutting edges 50 of the teeth 48 and have an incline of 30 to 45 degrees in relation to the longitudinal axis of the nail.

The inner edges of the inclined sides 51 terminate in surfaces 52 which continue to the face of the next adjacent tooth. These surfaces 52 are tapered the same as the outer cutting edges 50 of the teeth 48. The surfaces 52 are for the purpose of forming the shallow recesses 53 which lie between the teeth thereby adapting them to be clogged with extruded or pressed metal during the penetration of the nail 40.

In a nail made from this design, the shank 41 has been made .140 inch in diameter and the distance between adjacent teeth 48 has been .020 inch. These dimensions can be varied to suit the individual use.

With reference to Figs. 8 and 9 the nail 40 is illustrated at different phases of the process of penetration of light gauge sheet metal. In Fig. 8 the nail 40 is illustrated immediately after the flat end 46 has punched a smooth round hole in the metal without leaving a jagged hole as would be the case with a sharp point. The smooth tapered section 45 is shown passing through the sheet metal 54 and forming therewith a substantially deep and smooth collar 55 without tearing the metal. It is desired that collar 55 have substantial depth to thereby form a large surface on the inner walls of the opening within the collar 55. This large surface gives the teeth 48 a much longer and larger gripping area than would be the case if the collar 55 had not been deeply formed.

Fig. 9 illustrates the toothed section 47 of the nail 40 in position within collar 55. Sheet metal rings 56 have been cut or pressed from the adjacent area and now clog the recesses 53 of the toothed section 47 thereby forming a very tight bond between the sheet metal 54 and the nail 40. This bond is so complete that nails of this design have required an average of 300 pounds before being removed from 20 gauge sheet metal which has a thickness of .035 inch.

Also illustrated in Fig. 9 is the position of the sheet metal 54 after a substantial force has been applied to the nail 40 in an effort to remove the nail. Instead of the bond between the nail and the surrounding sheet metal having been broken, the collar 55 is forced upward and inward toward the nail within sheet 54 thereby gripping the nail 40 still tighter. In a number of cases it has been found that the collar 55 must be actually drawn upward causing the surrounding sheet metal 54 to cup upward before the nail 40 has been removed.

The nail 40 of Fig. 6 is normally formed in an operation similar to the operation previously described for nail 14 of Fig. 1. The specific process and dies therefor will be described further in another portion of this application. This process leaves the alignment of the outer cutting edges 50 of the teeth 48 smoothly merging into the walls of the shank 41 of the nail 40.

With reference to Fig. 10 a nail 56 is shown that has a head 57 joined to a short shank 58 which in turn is joined to an anchoring section 59 which terminates in a penetrating portion 60. Section 59 has a series of teeth 61 on it which slightly increase in diameter from point 60 to shank 58 and progessively decrease in longitudinal width from point 60 to shank 58. These teeth 61 are tapered during manufacture by progressively widening and deepening the grooves 62 from the point 60 to the shank 58. In this particular embodiment the diameter of the grooves 62 progressively decrease along a slight taper from the point 60 to the shank 58.

When the nail is being driven, the teeth 61 have cutting edges 63 facing toward point 60 which progressively cut and force the material into the grooves 62 immediately in front of them, thereby highly compressing the excess material within the grooves thereby forming a very tight bond between the nail and the material. This nail 56 is designed for use in comparably softer materials than metal, such as wood, and is very effective in use as a siding nail or dry wall nail.

With reference to Figs. 11–13 a combination rivet and bushing 64 is illustrated which has a cone shape head 65 joined to an anchoring or fastening section 66. Head 65 can have any number of shapes or might be omitted altogether when desired. The anchoring section 66 has annular teeth 67 which progressively increase in diameter from the forward end of the rivet to the head end. These annular teeth extrude and broach metal when being driven therein in the same way as explained for the nails illustrated in Figs. 1 or 6. A tapped hole 68 having threads 69 thereon extends longitudinally through the rivet 64 from the head end to the forward end.

With further reference to Figs. 12 and 13 the rivet 64 in Fig. 12 is illustrated in initial position before being driven into a pre-drilled hole 70 in a section of metal 71. In Fig. 13 the rivet 64 is illustrated during driving with the teeth 67 progressively cutting and pressing material into the grooves lying immediately in front of the teeth, thereby forming a very tight bond between the metal section 71 and the rivet 64. After the rivet 64 has been finally driven into position the tapped hole 68 can be used to hold a bolt or other types of threaded fasteners and therefore performs the function of a bushing.

With reference to Fig. 14 the combination rivet-bushing 64 of Fig. 11 is shown during the process of being manufactured. The rivet 64 has an extended shank 72 joined to its head 65. The shank 72 is illustrated with knurling or ribbing thereon which it has received during the process of rolling the tapering teeth 67 on the anchoring section 66. Once this rolling process is completed, the extended shank is removed from the rivet 64 prior to its use.

With reference to Fig. 15 a nail rolling die 73 is illustrated which has an upper surface that has a nail shank gripping section 74 and an extruding section 75. The shank gripping surface 74 has knurling or ribbing 76 which firmly grips the nail shank by biting into the nail shank during the rolling process. It should be understood that while Fig. 15 only illustrates a single die, the process requires two dies with the surfaces 74 and 75 of each die facing each other with the nail lying between the die. As the dies are moved along parallel paths in opposite directions to each other with the nail held between them, the nail blank is rotated between shank gripping sections 74.

Extruding section 75 consists of a surface which is progressively elevated from a line 77 adjacent the section 74 which is parallel to the movement of the die. This surface lies in a plane which corresponds to the taper desired for the fastener that is thereby made. The extruding surface 75 further carries a tooth forming surface 78 for forming the anchor teeth on the fastener after the taper has been formed on the surface of the nail or fastener. The surface 75 terminates at its elevated position along a line 79 which connects with line 77 at the forward end of the die, the end which initially grips the nail. From line 79 a drop-off surface 80 extends to the remaining surface 81 of the die. Surface 80 may lie in a plane that connects with the plane of surface 81 by an angle of 45 degrees to 1 degree. In practice it has been found that 1 degree is very satisfactory.

With reference to Fig. 16 one of the dies 73 is shown with a nail blank 82 during the process of being rolled. In Fig. 17, the nail blank 82 is shown immediately after the conical point 83 is formed during the process of being beaten or pressed from a continuous length of wiring. A head 84 is also shown in Fig. 17 although this could be omitted if desired depending on the type of fastener being formed. As the nail is rolled between the pair of the dies 73, the tapered portion 85 is progressively formed or extruded as it passes over the extruding section 75 of the dies. It should be understood that the companion die of the die shown in Fig. 16 would have its extruding section 75 and teeth forming section 78 positioned in an opposite direction from that shown. The extruding of the taper 85 takes place along the line 79 and is formed progressively as the nail continues over the section 75. Due to this continuous extruding process the nail blank 82 has been substantially lengthened after the rolling process is completed. After the taper 85 of the nail blank 82 has been completely formed, the nail rolls into the teeth forming section 78 where the teeth 86 are pressed into the tapering portion 85.

The finished nail 82 is shown in Fig. 18 with the knurled or ribbed shank formed between gripping surface 74 of the dies and the tapered and toothed section 86 formed between sections 75 and 78 of the dies.

This process has been devised for satisfactorily forming a taper on a nail as it has been found very difficult to roll a taper without the use of the bevelled extruding surface 75 with the drop off surface 80. The surface 75 progressively extrudes the taper on the nail as it moves through the die. The force required to force the dies together is much less than in the previous processes where the taper is rolled into the nail simultaneously.

This process has been particularly devised to manufacture the nail described in Fig. 6 although many other types of tapered fasteners could be made using it such as the nail of Fig. 1 and the combination rivet bushing of Fig. 11.

It will be obvious to those skilled in the art that various changes may be made in the invention without departing from the spirit and scope thereof and therefore the invention is not limited by that which is illustrated in the drawing and described in the specification, but only as indicated in the appended claims.

What is claimed is:

1. A nail for fastening insulation to relatively thin sheet metal having a thickness of approximately 16 to 24 gauge, said nail having a driving end portion and having a penetrating end portion with a generally frusto-conical gently tapering anchoring and sealing portion therebetween, said penetrating portion being tapered from its penetrating extremity substantially to said anchoring and sealing portion and said anchoring and sealing portion extending from said penetrating portion and increasing in transverse dimension towards said driving end portion, and having substantially parallel cutting portions extending around the same and facing said penetrating end portion with no part of the anchoring and sealing portion between adjacent cutting edge of greater transverse dimension than the cutting edge of smaller transverse dimension and with at least a portion thereof of less transverse dimension, and with the spacing of the cutting edges less than one-half the thickness of the metal through which the nail is adapted to be driven.

2. A nail for fastening insulation to relatively thin sheet metal, said nail having a driving end portion and a penetrating end portion with a generally frusto-conical gently tapering anchoring and sealing portion therebetween, said penetrating portion being tapered from its penetrating extremity substantially to said anchoring and sealing portion and said anchoring and sealing portion extending from said penetrating portion and increasing in transverse dimension towards said driving end portion, and having substantially parallel cutting edges extending around the same and facing said penetrating end portion with no part of the anchoring and sealing portion between adjacent cutting edges of greater transverse dimension than the cutting edge of smaller transverse dimension and with at least a portion thereof of less transverse dimension, and with the spacing of the cutting edges less than one-half the thickness of the metal with which the anchoring and sealing portion of the nail is adapted to be engaged.

3. A driven fastener of the character indicated in claim 2 in which a shaft connects the upper end of the tapered anchoring and sealing portion to a head or driving end member and in which said shaft has a transverse dimension equal to or greater than that of the largest cutting edge.

4. The structure of claim 2 in which the adjacent cutting edges differ in transverse dimension by not more than .002 inch.

5. The structure of claim 2 in which the penetrating end portion of the nail is hardened.

6. A driven fastener of the character indicated in claim 2 in which said cutting edges are case hardened to cut into the metal and progressively cause material to move into the recesses between the cutting edges to provide an interlock when the nail is driven into the metal.

7. The structure of claim 2 in which the portion of less transverse dimension provides shallow recesses in which the material into which the nail is driven is caused to move and interlock and provide an hermetic seal.

8. The structure of claim 2 in which the cutting edges are spaced substantially constant.

References Cited in the file of this patent

UNITED STATES PATENTS

| | | |
|---|---|---|
| 169,257 | Goddu | Oct. 26, 1875 |
| 206,515 | Wires | July 30, 1878 |
| 340,692 | Bailey | Apr. 27, 1886 |
| 1,273,427 | Von Schrenk | July 23, 1918 |
| 1,913,143 | Robertson | June 6, 1933 |
| 1,948,889 | Simon | Feb. 27, 1934 |
| 2,015,159 | Rosenberg | Sept. 24, 1935 |
| 2,024,071 | Taylor | Dec. 10, 1935 |
| 2,049,105 | Clarke | July 28, 1936 |
| 2,126,585 | Stone | Aug. 9, 1938 |
| 2,174,968 | Cherry et al. | Oct. 3, 1939 |
| 2,226,141 | Sabo | Dec. 24, 1940 |
| 2,428,259 | Anstett | Sept. 30, 1947 |